US008664129B2

(12) United States Patent
Dharmarajan et al.

(10) Patent No.: US 8,664,129 B2
(45) Date of Patent: Mar. 4, 2014

(54) EXTENSIBLE NONWOVEN FACING LAYER FOR ELASTIC MULTILAYER FABRICS

(75) Inventors: Narayanaswami Raja Dharmarajan, Houston, TX (US); Prasadarao Meka, Seabrook, TX (US)

(73) Assignee: ExxonMobil Chemical Patents Inc., Houston, TX (US)

( * ) Notice: Subject to any disclaimer, the term of this patent is extended or adjusted under 35 U.S.C. 154(b) by 848 days.

(21) Appl. No.: 12/271,526

(22) Filed: Nov. 14, 2008

(65) Prior Publication Data

US 2010/0124864 A1    May 20, 2010

(51) Int. Cl.
B32B 5/26       (2006.01)
D04H 13/00    (2006.01)
D04H 5/06      (2006.01)
B29C 65/00    (2006.01)

(52) U.S. Cl.
USPC ........... 442/381; 442/327; 442/329; 442/389; 156/60; 156/308.2

(58) Field of Classification Search
USPC ......... 442/327–329, 381–384, 389, 403, 407, 442/411, 415; 156/308.2, 311
See application file for complete search history.

(56) References Cited

U.S. PATENT DOCUMENTS

| | | |
|---|---|---|
| 3,149,178 A | 9/1964 | Hamilton et al. |
| 3,338,992 A | 8/1967 | Kinney |
| 3,341,394 A | 9/1967 | Kinney |
| 3,502,763 A | 3/1970 | Hartmann |
| 3,542,615 A | 11/1970 | Dobo et al. |
| 3,692,618 A | 9/1972 | Dorschner et al. |
| 3,802,817 A | 4/1974 | Matsuki et al. |
| 3,849,241 A | 11/1974 | Butin et al. |
| 4,042,740 A | 8/1977 | Krueger |
| 4,100,324 A | 7/1978 | Anderson et al. |
| 4,103,058 A | 7/1978 | Humlicek |
| 4,105,381 A | 8/1978 | Platt et al. |
| 4,116,892 A | 9/1978 | Schwarz |
| 4,144,008 A | 3/1979 | Schwarz |
| 4,153,751 A | 5/1979 | Schwarz |
| 4,177,312 A | 12/1979 | Rasen et al. |
| 4,209,563 A | 6/1980 | Sisson |
| 4,223,059 A | 9/1980 | Schwarz |
| 4,251,585 A | 2/1981 | Schwarz |
| 4,252,590 A | 2/1981 | Rasen et al. |
| 4,285,100 A | 8/1981 | Schwarz |
| 4,289,832 A | 9/1981 | Schwarz |
| 4,340,563 A | 7/1982 | Appel et al. |
| 4,368,565 A | 1/1983 | Schwarz |
| 4,380,570 A | 4/1983 | Schwarz |
| 4,410,602 A | 10/1983 | Komoda et al. |
| 4,461,872 A * | 7/1984 | Su .................... 525/240 |
| 4,540,753 A | 9/1985 | Cozewith et al. |
| 4,657,802 A | 4/1987 | Morman |
| 4,775,579 A | 10/1988 | Hagy et al. |
| 4,818,464 A | 4/1989 | Lau |
| 4,827,064 A | 5/1989 | Wu |
| 4,827,073 A | 5/1989 | Wu |
| 4,950,720 A | 8/1990 | Randall, Jr. et al. |
| 4,965,122 A | 10/1990 | Morman |
| 4,981,747 A | 1/1991 | Morman |
| 5,017,714 A | 5/1991 | Welborn, Jr. |
| 5,055,438 A | 10/1991 | Canich |
| 5,057,475 A | 10/1991 | Canich et al. |
| 5,078,935 A | 1/1992 | Kobayashi et al. |
| 5,096,867 A | 3/1992 | Canich |
| 5,108,820 A | 4/1992 | Kaneko et al. |
| 5,108,827 A | 4/1992 | Gessner |
| 5,114,787 A | 5/1992 | Chaplin et al. |
| 5,130,076 A | 7/1992 | Blatz et al. |
| 5,143,679 A | 9/1992 | Weber et al. |
| 5,145,727 A | 9/1992 | Potts et al. |
| 5,147,712 A | 9/1992 | Miyahara et al. |
| 5,153,157 A | 10/1992 | Hlatky et al. |
| 5,156,793 A | 10/1992 | Buell et al. |
| 5,167,897 A | 12/1992 | Weber et al. |
| 5,171,908 A | 12/1992 | Rudnick |
| 5,182,162 A | 1/1993 | Andrusko |
| 5,187,005 A | 2/1993 | Stahle et al. |
| 5,188,885 A | 2/1993 | Timmons et al. |
| 5,190,812 A | 3/1993 | Joseph et al. |
| 5,198,401 A | 3/1993 | Turner et al. |

(Continued)

FOREIGN PATENT DOCUMENTS

CA    1 268 753    5/1990
EP    0 129 368    12/1984

(Continued)

OTHER PUBLICATIONS

Achieve.TM Polypropylene Homopolymer technical bulletin, published online by ExxonMobile Chemical copyright 2011.*
Vistamaxx.TM V2120 TPO Material Data Center Datasheet, ExxonMobil Chemical, downloaded from the internet, Apr. 23, 2013.*
Dutta, S. et al., "*More Efficient Manufacture of Controlled-Rheology Polypropylene*", Society of Plastics Engineers, Plastics Research Online (2010).
Polypropylene Handbook, Polymerization, Characterization, Properties, Processing, Applications, E. P. Moore, ed., Hanser Publishers, pp. 314-319 (1996).

(Continued)

*Primary Examiner* — Jennifer A Steele

(57) ABSTRACT

Disclosed is a multilayer fabric and a method of forming a multilayer fabric comprising one or more facing layers and one or more elastic layers adjacent to or sandwiched there between, the one or more facing layers comprising a polypropylene; and a propylene-α-olefin elastomer having and an MFR of less than 80 dg/min; wherein the facing layer is extensible and non-elastic and has a Handle-O-Meter value of less than 60 g and a 1% Secant Flexural Modulus of less than 1000 MPa. In certain embodiments, polyethylenes are absent from the facing layer(s).

23 Claims, No Drawings

(56) References Cited

U.S. PATENT DOCUMENTS

| | | |
|---|---|---|
| 5,226,992 A | 7/1993 | Morman |
| 5,227,224 A | 7/1993 | Ishikawa et al. |
| 5,230,949 A | 7/1993 | Howard et al. |
| 5,234,423 A | 8/1993 | Alemany et al. |
| 5,238,733 A | 8/1993 | Joseph et al. |
| 5,240,894 A | 8/1993 | Burkhardt et al. |
| 5,242,436 A | 9/1993 | Weil et al. |
| 5,244,724 A | 9/1993 | Antonacci et al. |
| 5,260,126 A | 11/1993 | Collier, IV et al. |
| 5,264,405 A | 11/1993 | Canich |
| 5,272,003 A | 12/1993 | Peacock |
| 5,288,791 A | 2/1994 | Collier, IV et al. |
| 5,292,389 A | 3/1994 | Tsuji et al. |
| 5,294,482 A | 3/1994 | Gessner |
| 5,306,545 A | 4/1994 | Shirayanagi et al. |
| 5,320,891 A | 6/1994 | Levy et al. |
| 5,324,576 A | 6/1994 | Reed et al. |
| 5,324,580 A | 6/1994 | Allan et al. |
| 5,324,800 A | 6/1994 | Welborn, Jr. et al. |
| 5,330,458 A | 7/1994 | Buell et al. |
| 5,330,829 A | 7/1994 | Miller |
| 5,332,613 A | 7/1994 | Taylor et al. |
| 5,334,636 A | 8/1994 | Fujii et al. |
| 5,336,457 A | 8/1994 | Wu et al. |
| 5,336,545 A | 8/1994 | Morman |
| 5,346,756 A | 9/1994 | Ogale et al. |
| 5,349,016 A | 9/1994 | DeNicola, Jr. et al. |
| 5,358,500 A | 10/1994 | Lavon et al. |
| 5,366,782 A | 11/1994 | Curro et al. |
| 5,366,786 A | 11/1994 | Connor et al. |
| 5,366,793 A | 11/1994 | Fitts, Jr. et al. |
| 5,368,584 A | 11/1994 | Clear et al. |
| 5,368,919 A | 11/1994 | Robeson |
| 5,368,927 A | 11/1994 | Lesca et al. |
| 5,372,885 A | 12/1994 | Tabor et al. |
| 5,382,400 A | 1/1995 | Pike et al. |
| 5,382,461 A | 1/1995 | Wu |
| 5,385,775 A | 1/1995 | Wright |
| 5,393,599 A | 2/1995 | Quantrille et al. |
| 5,418,045 A | 5/1995 | Pike et al. |
| 5,422,172 A | 6/1995 | Wu |
| 5,425,987 A | 6/1995 | Shawver et al. |
| 5,455,110 A | 10/1995 | Connor |
| 5,464,401 A | 11/1995 | Hasse et al. |
| 5,466,411 A | 11/1995 | Butterfass et al. |
| 5,472,775 A | 12/1995 | Obijeski et al. |
| 5,476,616 A | 12/1995 | Schwarz |
| 5,482,765 A | 1/1996 | Bradley et al. |
| 5,482,772 A | 1/1996 | Strack et al. |
| 5,492,753 A | 2/1996 | Levy et al. |
| 5,496,298 A | 3/1996 | Kuepper et al. |
| 5,507,736 A | 4/1996 | Clear et al. |
| 5,523,141 A | 6/1996 | Fyler |
| 5,534,339 A | 7/1996 | Stokes |
| 5,534,340 A | 7/1996 | Gupta et al. |
| 5,536,563 A | 7/1996 | Shah et al. |
| 5,540,976 A | 7/1996 | Shawver et al. |
| 5,549,964 A | 8/1996 | Shohji et al. |
| 5,556,392 A | 9/1996 | Koczab |
| 5,573,841 A | 11/1996 | Adam et al. |
| 5,575,783 A | 11/1996 | Clear et al. |
| 5,591,152 A | 1/1997 | Buell et al. |
| 5,593,768 A | 1/1997 | Gessner |
| 5,607,798 A | 3/1997 | Kobylivker et al. |
| 5,616,408 A | 4/1997 | Oleszczuk et al. |
| 5,620,785 A | 4/1997 | Watt et al. |
| 5,628,741 A | 5/1997 | Buell et al. |
| 5,635,290 A | 6/1997 | Stopper et al. |
| 5,641,445 A | 6/1997 | Fauble et al. |
| 5,643,662 A | 7/1997 | Yeo et al. |
| 5,645,542 A | 7/1997 | Anjur et al. |
| 5,645,933 A | 7/1997 | Sakazume et al. |
| 5,652,051 A | 7/1997 | Shawver et al. |
| 5,653,704 A | 8/1997 | Buell et al. |
| 5,672,415 A | 9/1997 | Sawyer et al. |
| 5,674,216 A | 10/1997 | Buell et al. |
| 5,681,646 A | 10/1997 | Ofosu et al. |
| 5,688,157 A | 11/1997 | Bradley et al. |
| 5,690,627 A | 11/1997 | Clear et al. |
| 5,695,849 A | 12/1997 | Shawver et al. |
| 5,695,868 A | 12/1997 | McCormack |
| 5,698,480 A | 12/1997 | Geiman et al. |
| 5,720,832 A | 2/1998 | Minto et al. |
| 5,723,217 A | 3/1998 | Stahl et al. |
| 5,733,822 A | 3/1998 | Gessner et al. |
| 5,783,531 A | 7/1998 | Andrew et al. |
| 5,804,286 A | 9/1998 | Quantrille et al. |
| 5,817,403 A | 10/1998 | Gillyns et al. |
| 5,824,613 A | 10/1998 | Geiman et al. |
| 5,840,412 A | 11/1998 | Wood et al. |
| 5,843,057 A | 12/1998 | McCormack |
| 5,843,068 A | 12/1998 | Allen et al. |
| 5,861,202 A | 1/1999 | Kimura et al. |
| 5,866,488 A | 2/1999 | Terada et al. |
| 5,874,160 A | 2/1999 | Keck |
| 5,880,241 A | 3/1999 | Brookhart et al. |
| 5,906,879 A | 5/1999 | Huntoon et al. |
| 5,910,362 A | 6/1999 | Aratake et al. |
| 5,914,084 A | 6/1999 | Benson et al. |
| 5,914,184 A | 6/1999 | Morman |
| 5,916,207 A | 6/1999 | Toyoda et al. |
| 5,921,973 A | 7/1999 | Newkirk et al. |
| 5,928,740 A | 7/1999 | Wilhoit et al. |
| 5,942,451 A | 8/1999 | Daponte et al. |
| 5,945,215 A | 8/1999 | Bersted et al. |
| 5,952,252 A | 9/1999 | Shawver et al. |
| 5,985,193 A | 11/1999 | Harrington et al. |
| 5,993,714 A | 11/1999 | Sawyer et al. |
| 5,994,244 A | 11/1999 | Fujiwara et al. |
| 6,015,605 A | 1/2000 | Tsujiyama et al. |
| 6,015,617 A | 1/2000 | Maugans et al. |
| 6,015,764 A | 1/2000 | McCormack et al. |
| 6,028,240 A | 2/2000 | Wessel et al. |
| 6,037,281 A | 3/2000 | Mathis et al. |
| 6,045,898 A | 4/2000 | Kishi et al. |
| 6,071,451 A | 6/2000 | Wang et al. |
| 6,075,179 A | 6/2000 | McCormack et al. |
| 6,080,818 A * | 6/2000 | Thakker et al. ............ 525/240 |
| 6,083,583 A | 7/2000 | Klocek et al. |
| 6,090,472 A | 7/2000 | Wang et al. |
| 6,090,730 A | 7/2000 | Fujiwara et al. |
| 6,096,668 A | 8/2000 | Abuto et al. |
| 6,103,647 A | 8/2000 | Shultz et al. |
| 6,114,261 A | 9/2000 | Strelow et al. |
| 6,114,263 A | 9/2000 | Benson et al. |
| 6,117,546 A | 9/2000 | Geiman et al. |
| 6,140,551 A | 10/2000 | Niemeyer et al. |
| 6,207,237 B1 | 3/2001 | Haffner |
| 6,207,601 B1 | 3/2001 | Maurer et al. |
| 6,207,602 B1 | 3/2001 | Gessner et al. |
| 6,224,977 B1 | 5/2001 | Kobylivker et al. |
| 6,261,674 B1 | 7/2001 | Branham et al. |
| 6,268,203 B1 | 7/2001 | Johnson et al. |
| 6,268,302 B1 | 7/2001 | Ofosu et al. |
| 6,281,289 B1 | 8/2001 | Maugans et al. |
| 6,286,145 B1 | 9/2001 | Welchel et al. |
| 6,312,641 B1 | 11/2001 | Hutchinson |
| 6,323,389 B1 | 11/2001 | Thomas et al. |
| 6,342,565 B1 | 1/2002 | Cheng et al. |
| 6,352,426 B1 | 3/2002 | Hutchinson et al. |
| 6,355,348 B1 | 3/2002 | Takesue et al. |
| 6,362,389 B1 | 3/2002 | McDowall et al. |
| 6,372,172 B1 | 4/2002 | Sudduth et al. |
| 6,391,408 B1 | 5/2002 | Hutchinson |
| 6,410,465 B1 | 6/2002 | Lim et al. |
| 6,417,121 B1 | 7/2002 | Newkirk et al. |
| 6,417,122 B1 | 7/2002 | Newkirk et al. |
| 6,420,285 B1 | 7/2002 | Newkirk et al. |
| 6,443,940 B1 | 9/2002 | Ashton et al. |
| 6,444,774 B1 | 9/2002 | Stahl et al. |
| 6,455,170 B1 | 9/2002 | Yasui et al. |
| 6,458,726 B1 | 10/2002 | Harrington et al. |
| 6,465,073 B1 | 10/2002 | Morman et al. |
| 6,465,378 B2 | 10/2002 | Gessner et al. |

(56) References Cited

U.S. PATENT DOCUMENTS

| | | |
|---|---|---|
| 6,476,289 B1 | 11/2002 | Buell et al. |
| 6,478,785 B1 | 11/2002 | Ashton et al. |
| 6,482,896 B2 * | 11/2002 | Maugans et al. ............ 525/191 |
| 6,503,853 B1 | 1/2003 | Kassner et al. |
| 6,506,695 B2 | 1/2003 | Gardner et al. |
| 6,506,698 B1 | 1/2003 | Quantrille et al. |
| 6,516,472 B2 | 2/2003 | Gessner et al. |
| 6,525,157 B2 | 2/2003 | Cozewith et al. |
| 6,559,262 B1 | 5/2003 | Waymouth et al. |
| 6,569,945 B2 | 5/2003 | Bugada et al. |
| 6,572,598 B1 | 6/2003 | Ashton et al. |
| 6,579,274 B1 | 6/2003 | Morman et al. |
| 6,582,414 B1 | 6/2003 | Richardson |
| 6,586,354 B1 | 7/2003 | Topolkaraev et al. |
| 6,589,892 B1 | 7/2003 | Smith et al. |
| 6,610,039 B1 | 8/2003 | Wilhelm et al. |
| 6,627,564 B1 | 9/2003 | Morman et al. |
| 6,632,212 B1 | 10/2003 | Morman et al. |
| 6,649,546 B2 | 11/2003 | Ohata |
| 6,649,547 B1 | 11/2003 | Arnold et al. |
| 6,676,883 B2 | 1/2004 | Hutchinson et al. |
| 6,717,028 B1 | 4/2004 | Oberstadt |
| 6,777,082 B2 | 8/2004 | Patel et al. |
| 6,780,272 B2 | 8/2004 | Wood |
| 6,881,793 B2 | 4/2005 | Sheldon et al. |
| 6,881,800 B2 | 4/2005 | Friedersdorf |
| 6,887,941 B2 | 5/2005 | Zhou |
| 6,902,796 B2 | 6/2005 | Morell et al. |
| 6,906,160 B2 | 6/2005 | Stevens et al. |
| 6,909,028 B1 | 6/2005 | Shawver et al. |
| 6,914,018 B1 | 7/2005 | Uitenbroek et al. |
| 6,927,184 B1 | 8/2005 | Jacobs-Hartwig et al. |
| 6,939,591 B2 | 9/2005 | Hutchinson et al. |
| 6,946,413 B2 | 9/2005 | Lange et al. |
| 6,960,635 B2 | 11/2005 | Stevens et al. |
| 6,982,231 B1 | 1/2006 | Uitenbroek et al. |
| 6,989,125 B2 | 1/2006 | Boney et al. |
| 6,992,158 B2 | 1/2006 | Datta et al. |
| 6,994,763 B2 | 2/2006 | Austin |
| 7,019,081 B2 | 3/2006 | Datta et al. |
| 7,022,632 B2 | 4/2006 | Hatta et al. |
| 7,026,404 B2 | 4/2006 | Cozewith et al. |
| 7,078,089 B2 | 7/2006 | Ellis et al. |
| 7,101,622 B2 | 9/2006 | Chang et al. |
| 7,101,623 B2 | 9/2006 | Jordan et al. |
| 7,199,203 B2 | 4/2007 | Stevens et al. |
| 7,261,551 B2 | 8/2007 | Hutchinson et al. |
| 7,300,895 B2 | 11/2007 | Kobayashi et al. |
| 7,318,961 B2 | 1/2008 | Loos et al. |
| 7,319,077 B2 | 1/2008 | Mehta et al. |
| 7,320,948 B2 | 1/2008 | Morman et al. |
| 7,329,621 B2 | 2/2008 | Collier, IV et al. |
| 7,332,204 B2 | 2/2008 | Hutchinson et al. |
| 7,335,273 B2 | 2/2008 | Neculescu et al. |
| 7,344,775 B2 | 3/2008 | Stevens et al. |
| 7,355,089 B2 | 4/2008 | Chang et al. |
| 7,355,091 B2 | 4/2008 | Kellenberger et al. |
| 7,404,811 B2 | 7/2008 | Ohnishi et al. |
| 7,405,171 B2 | 7/2008 | Tsujiyama et al. |
| 7,405,172 B2 | 7/2008 | Shigematsu et al. |
| 7,413,803 B2 | 8/2008 | Jordan et al. |
| 7,425,517 B2 | 9/2008 | Deka et al. |
| 7,438,777 B2 | 10/2008 | Pourdeyhimi et al. |
| 7,439,301 B2 | 10/2008 | Handlin, Jr. |
| 7,445,831 B2 | 11/2008 | Ashraf et al. |
| 7,445,838 B2 | 11/2008 | Quinn |
| 7,452,832 B2 | 11/2008 | Bansal et al. |
| 7,462,573 B2 | 12/2008 | Tsujiyama et al. |
| 7,476,447 B2 | 1/2009 | Thomas |
| 7,491,666 B2 | 2/2009 | Smith et al. |
| 7,494,709 B2 | 2/2009 | Davis |
| 7,494,947 B2 | 2/2009 | Boscolo |
| 7,501,034 B2 | 3/2009 | Ashraf |
| 7,601,666 B2 | 10/2009 | Rix et al. |
| 7,795,366 B2 | 9/2010 | Yang et al. |
| 2002/0019507 A1 | 2/2002 | Karandinos et al. |
| 2002/0055316 A1 | 5/2002 | Araida et al. |
| 2003/0125696 A1 | 7/2003 | Morman et al. |
| 2003/0194939 A1 | 10/2003 | Schwarz |
| 2004/0110442 A1 | 6/2004 | Rhim et al. |
| 2004/0121687 A1 | 6/2004 | Morman et al. |
| 2004/0209540 A1 | 10/2004 | Schwarz |
| 2004/0236042 A1 | 11/2004 | Datta et al. |
| 2005/0027080 A1 * | 2/2005 | Bodiford et al. ............ 525/331.7 |
| 2005/0106978 A1 | 5/2005 | Cheng et al. |
| 2005/0130544 A1 | 6/2005 | Cheng et al. |
| 2005/0148263 A1 | 7/2005 | Zhou et al. |
| 2005/0170729 A1 | 8/2005 | Stadelman et al. |
| 2006/0003658 A1 | 1/2006 | Hall et al. |
| 2006/0135923 A1 | 6/2006 | Boggs et al. |
| 2006/0141886 A1 | 6/2006 | Brock et al. |
| 2006/0151914 A1 | 7/2006 | Gerndt et al. |
| 2006/0172647 A1 * | 8/2006 | Mehta et al. ................. 442/327 |
| 2006/0173123 A1 | 8/2006 | Yang et al. |
| 2006/0199006 A1 | 9/2006 | Poon et al. |
| 2006/0210746 A1 | 9/2006 | Shi et al. |
| 2006/0270303 A1 | 11/2006 | Berrigan et al. |
| 2007/0017075 A1 | 1/2007 | Nguyen |
| 2007/0078222 A1 | 4/2007 | Chang et al. |
| 2007/0092704 A1 | 4/2007 | Patel et al. |
| 2007/0123131 A1 | 5/2007 | Nguyen et al. |
| 2007/0135785 A1 | 6/2007 | Qin et al. |
| 2007/0141937 A1 | 6/2007 | Hendrix et al. |
| 2007/0161747 A1 | 7/2007 | Maier et al. |
| 2007/0173162 A1 | 7/2007 | Ethiopia et al. |
| 2007/0184256 A1 | 8/2007 | Okada et al. |
| 2007/0197117 A1 | 8/2007 | Austin et al. |
| 2007/0202330 A1 | 8/2007 | Peng et al. |
| 2007/0203301 A1 | 8/2007 | Autran et al. |
| 2007/0203469 A1 | 8/2007 | Ohnishi et al. |
| 2007/0254545 A1 | 11/2007 | Martin |
| 2007/0287348 A1 * | 12/2007 | Autran et al. ................. 442/327 |
| 2008/0003910 A1 | 1/2008 | Hughes et al. |
| 2008/0014819 A1 | 1/2008 | Suzuki et al. |
| 2008/0026660 A1 | 1/2008 | Ogawa et al. |
| 2008/0038982 A1 | 2/2008 | Motomura et al. |
| 2008/0045917 A1 | 2/2008 | Autran et al. |
| 2008/0061476 A1 | 3/2008 | Hutchinson et al. |
| 2008/0076315 A1 | 3/2008 | McCormack et al. |
| 2008/0119102 A1 | 5/2008 | Hughes et al. |
| 2008/0132135 A1 | 6/2008 | Collias et al. |
| 2008/0132862 A1 | 6/2008 | Collias et al. |
| 2008/0132866 A1 | 6/2008 | Siqueira et al. |
| 2008/0160859 A1 | 7/2008 | Gupta et al. |
| 2008/0160862 A1 | 7/2008 | Sartori et al. |
| 2008/0161765 A1 | 7/2008 | Morman et al. |
| 2008/0172840 A1 | 7/2008 | Kacker et al. |
| 2008/0177242 A1 | 7/2008 | Chang et al. |
| 2008/0182116 A1 | 7/2008 | Dharmarajan et al. |
| 2008/0182468 A1 | 7/2008 | Dharmarajan et al. |
| 2008/0182473 A1 | 7/2008 | Chen et al. |
| 2008/0182940 A1 | 7/2008 | Dharmarajan et al. |
| 2008/0199673 A1 | 8/2008 | Allgeuer et al. |
| 2008/0207071 A1 | 8/2008 | Muslet et al. |
| 2008/0220273 A1 | 9/2008 | Weaver |
| 2008/0221540 A1 | 9/2008 | Thomas et al. |
| 2008/0233819 A1 | 9/2008 | Tsujiyama et al. |
| 2008/0233824 A1 | 9/2008 | Abed et al. |
| 2008/0237911 A1 | 10/2008 | Ardiff et al. |
| 2008/0241447 A1 | 10/2008 | Shi |
| 2008/0251492 A1 | 10/2008 | Shi |
| 2008/0287027 A1 | 11/2008 | Suzuki et al. |
| 2008/0299857 A1 | 12/2008 | Harding et al. |
| 2008/0300567 A1 | 12/2008 | Ohnishi et al. |
| 2008/0311815 A1 | 12/2008 | Gupta et al. |
| 2009/0068419 A1 | 3/2009 | Pascavage |
| 2009/0068420 A1 | 3/2009 | Pascavage |
| 2009/0124153 A1 | 5/2009 | Dharmarajan et al. |
| 2009/0124154 A1 | 5/2009 | Harrington et al. |
| 2010/0081352 A1 | 4/2010 | Westwood |
| 2010/0124864 A1 | 5/2010 | Dharmarajan et al. |
| 2010/0222755 A1 | 9/2010 | Westwood |

(56) References Cited

U.S. PATENT DOCUMENTS

| | | | |
|---|---|---|---|
| 2010/0222761 A1 | 9/2010 | Westwood et al. | |
| 2010/0266818 A1 | 10/2010 | Westwood et al. | |
| 2010/0267914 A1 | 10/2010 | Westwood et al. | |

FOREIGN PATENT DOCUMENTS

| | | |
|---|---|---|
| EP | 0 277 003 | 8/1988 |
| EP | 0 277 004 | 8/1988 |
| EP | 0 426 637 | 5/1991 |
| EP | 0 432 755 | 6/1991 |
| EP | 0 495 375 | 7/1992 |
| EP | 0 500 944 | 9/1992 |
| EP | 0 520 732 | 12/1992 |
| EP | 0 534 863 | 3/1993 |
| EP | 0 570 982 | 11/1993 |
| EP | 0 573 403 | 12/1993 |
| EP | 1 066 961 | 1/2001 |
| EP | 1 070 087 | 1/2001 |
| EP | 1 138 472 | 10/2001 |
| EP | 1 174 257 | 1/2002 |
| EP | 1 614 699 | 1/2006 |
| EP | 1 712 351 | 10/2006 |
| EP | 1 834 015 | 9/2007 |
| EP | 1 877 237 | 1/2008 |
| EP | 1 980 390 | 10/2008 |
| JP | 02/105833 | 4/2002 |
| JP | 2005/171456 | 6/2005 |
| JP | 4753852 | 8/2007 |
| JP | 2009-126000 | 6/2009 |
| WO | WO 91/09882 | 7/1991 |
| WO | WO 92/00333 | 1/1992 |
| WO | WO 92/16361 | 10/1992 |
| WO | WO 92/16366 | 10/1992 |
| WO | WO 94/03506 | 2/1994 |
| WO | WO 94/26816 | 11/1994 |
| WO | WO 98/39384 | 9/1998 |
| WO | WO 00/01745 | 1/2000 |
| WO | WO 00/18994 | 4/2000 |
| WO | WO 00/37723 | 6/2000 |
| WO | WO 00/38911 | 7/2000 |
| WO | WO 01/00915 | 1/2001 |
| WO | WO 01/00917 | 1/2001 |
| WO | WO 02/34511 | 5/2002 |
| WO | WO 02/36651 | 5/2002 |
| WO | WO 03/040201 | 5/2003 |
| WO | WO 2004/038078 | 5/2004 |
| WO | WO 2005/049672 | 6/2005 |
| WO | WO 2006/101631 | 9/2006 |
| WO | WO 2007/030170 | 3/2007 |
| WO | WO 2007/140163 | 12/2007 |
| WO | WO 2007/142736 | 12/2007 |
| WO | WO 2008/094337 | 8/2008 |
| WO | WO 2009/064583 | 5/2009 |
| WO | WO 2009/126712 | 10/2009 |
| WO | WO 2010/001273 | 1/2010 |
| WO | WO 2010/039579 | 4/2010 |
| WO | WO 2010/039583 | 4/2010 |
| WO | WO 2010/098792 | 9/2010 |
| WO | WO 2010/098793 | 9/2010 |
| WO | WO 2011/041575 | 4/2011 |

OTHER PUBLICATIONS

Vistamaxx™ 2120 Propylene-based Elastomer, data sheets. <URL: www.specialtyelastomers.com> copyright 2011.

Barden, B., "*Coated Fabrics*", Kirk-Othmer Encyclopedia of Chemical Technology, John Wiley & Sons, pp. 1-13 (1993).

Rooney, J.G. et al., "*On Line Determination By Light Scattering of Mechanical Degradation In the GPC Process*", Liquid Chromatography of Polymers and Related Materials III, Cazes, J. Ed., Marcel Dekker, pp. 207-234 (1981).

Chapman, R., "*Nonwoven Fabrics, Staple Fibers*", Kirk-Othmer Encyclopedia of Chemical Technology, John Wiley & Sons, pp. 1-27 (2005).

Cheng, H. N. "*hu 13C NMR Analysis of Ethylene-Propylene Rubbers*", Macromolecules, vol. 17, pp. 1950-1955 (1984).

Index05 Daily News, Apr. 14, 2005, in association with Nonwovens Report International, pp. 4.

Index08, Geneva Palexpo, Apr. 15-18, 2008, Biax-Fiberfilm Corporation.

E. P. Moore, Jr. ed., "9.2.1.1 Melt-Blown Fibers," in Polypropylene Handbook, Polymerization, Charaterization, Properties, Processing, Applications, pp. 314-324, copyright 1996.

Prabhu, P. et al., "*Evidence for Ethylene-Propylene Block Copolymer Formation*", J. Poly. Sci.: Polymer Letters Ed., vol. 18, pp. 389-394 (1980).

Rudnick, L.R. et al., "*Poly($\alpha$-olefins)*", Synthetic Lubricants and High Performance Functional Fluids", $2^{nd}$ Edition, Marcel Dekker, Inc., pp. 3-52 (1999).

Seyam, A.M. et al., "*An Examination of the Hydroentangling Process Variables*", in Int'l Nonwovens J., pp. 25-33 (Spring 2005).

Ver Strate, G. et al., "*Near Monodisperse Ethylene-Propylene Copolymers by Direct Ziegler-Natta Polymerization. Preparation, Characterization, Properties*", Macromolecules, vol. 21, pp. 3360-3371 (1988).

Zhao, R., "*Melt Blowing Polyoxymethylene Copolymer*", in Int'l Nonwovens J., pp. 19-24 (Summer 2005).

Zhao, R., "Stretching the Value of Melt Blown with Cellulose Microfiber and Elastic Resin," A Paper for Insight 2004, Austin, Texas, USA, Oct. 10-14, 2004, Biax Fiberfilm Corporation, Greenville, Wisconsin, pp. 1-13.

Dharmarajan, N. et al., "*Tailoring the Performance of Specialty Polyolefin Elastomer Based Elastic Nonwoven Fabrics*", INTC® 2006, International Nonwovens Technical Conference, Conference Proceedings, Houston, TX, United States, Sep. 25-28, 2006.

Harrington, B.A. et al., "*Processability and Fabric Attributes of Specialty Polyolefin Elastomers*", INTC® 2005, International Nonwovens Technical Conference, Conference Proceedings, St. Louis, MS, United States, Sep. 19-22, 2005.

Kacker, S. et al., "*Properties of Elastic Nonwoven Fabrics Based Upon Specialty Polyolefin Elastomers*", INTC® 2006, International Nonwovens Technical Conference, Conference Proceedings, Houston, TX, United States, Sep. 25-28, 2006.

Srivatsan, S. et al., "*Novel Polyolefin Resin for Elastic Spunbond & Melt Blown Applications*", INTC® 2004, Toronto, Canada, Sep. 20-23, 2004.

VISTAMAXX™ Specialty Elastomers for Meltblown Fabrics, data sheet. <URL: www.vistamaxxelastomers.com.

VISTAMAXX™ Specialty Elastomers VM2320, data sheet. <URL: www.vistamaxxelastomers.com.

VISTAMAXX™ Specialty Elastomers for Spunbond Fabrics, data sheet. URL: www.vistamaxxelastomers.com.

VISTAMAXX™ Specialty Elastomers—Unlimited Creative Potential. Imagine That! URL: www.vistamaxxelastomers.com.

Wheeler, L.M. et al., "*Gel Permeation Chromatography/Fourier Transform Infrared Interface for Polymer Analysis*", Applied Spectroscopy, vol. 47, No. 8, pp. 1128-1130 (1993).

\* cited by examiner

EXTENSIBLE NONWOVEN FACING LAYER FOR ELASTIC MULTILAYER FABRICS

FIELD OF THE INVENTION

The present invention relates to extensible facing layers for elastic multilayer nonwoven fabrics, and more particularly relates to extensible facing layers comprising propylene-based plastics and elastomers that have properties suitable for elastic articles such as diapers and personal hygiene products.

BACKGROUND

Elastomers are useful as elastic nonwovens or films in applications ranging from diaper waistband, adult incontinence, personal hygiene and other applications. Most of these elastic closures are constructed with facing layers that include a nonwoven substrate that is plastic in properties and provides aesthetic attributes such as touch, feel. Examples of such include those disclosed in US 2008/0045917 and its counterparts. The plastic facing layers sandwich the elastic (core) layer, which is inherently elastomeric and possesses a rubbery feel that is not desirable for skin contact in the closure applications. The composite nonwoven or film laminate comprising the outer facing layer and the inner elastic layer is subjected to a mechanical activation step that serves to remove the plastic constraints imposed by the facing layer. During the mechanical activation step, the fabric is subjected to stretch at very high strain rates, and if the facing layer is not ductile, the fabric will tear or suffer mechanical damage in the process. It is thus important that the facing layer be extensible to survive this activation step.

Spunbond polypropylene nonwovens, although they possess desirable aesthetic properties, are not extensible and are unlikely to be effectively activated in the high speed stretch process when used as facing layers. The disclosure of U.S. Pat. No. 5,804,286 describes a highly extensible spunbond nonwoven fabric comprising an isotactic 76 wt % isotactic polypropylene, 20% propylene copolymer and 4% polyethylene. A spunbond fabric of the above composition is abrasion resistant and has a cross direction (CD) elongation of 190%. Owing to the high extensibility, such nonwovens can be effectively used as facing layers. However, a less complex composition that will survive mechanical activation and having high miscibility would be preferable.

We solve this and other problems by providing a nonwoven facing layer comprising polypropylene and a low ethylene content propylene-based elastomer, where the ethylene content of the elastomer provides miscibility with the polypropylene homopolymer or copolymer. These formulations have high elongation and extensibility.

Other relevant disclosures include U.S. Pat. No. 5,272,003, U.S. Pat. No. 5,366,782, U.S. Pat. No. 6,075,179, U.S. Pat. No. 6,342,565, U.S. Pat. No. 7,026,404, US 2008/0199673, US 2008/0182116, US 2008/0182940, US 2008/0182468, US 2006/0172647, US 2005/0130544, US 2005/0106978 and WO 2008/094337.

SUMMARY

Disclosed in one embodiment is a multilayer fabric comprising one or more facing layers and one or more elastic layers adjacent to or sandwiched there between, the one or more facing layers comprising, or consisting essentially of a polypropylene; and a propylene-α-olefin elastomer having and an MFR of less than 80 dg/min; wherein the facing layer is extensible and non-elastic and has a Handle-O-Meter value of less than 60 g and a 1% Secant Flexural Modulus of less than 1000 MPa, or within the range of from 500 or 600 or 700 to 1000 MPa.

Disclosed in another embodiment is a multilayer fabric comprising one or more facing layers and one or more elastic layers adjacent to or sandwiched there between, the one or more facing layers comprising, or consisting essentially of a polypropylene; and within the range from 0.1 to 30 wt %, by weight of the facing layer, of a propylene-α-olefin elastomer having and an MFR of less than 80 dg/min, a triad tacticity of 75% or more, and comonomer-derived content within the range from 5 to 18 wt %, by weight of the propylene-α-olefin elastomer. In certain embodiments the one or more facing layers are carded or spunbond fabrics.

In certain embodiments of the multilayer fabric multilayer fabric has a layered structure selected from the group of consisting of $S_{ep}S_{el}M_{el}M_{el}S_{ep}$, $S_{ep}S_{el}M_{el}S_{el}S_{ep}$, $S_{ep}S_{el}M_{el}S_{el}C_{ep}$, $C_{ep}S_{el}M_{el}S_{el}C_{ep}$, $S_{ep}S_{el}M_{ep}S_{el}S_{ep}$, $S_{ep}S_{el}M_{ep}S_{el}C_{ep}$, $C_{ep}S_{el}M_{ep}S_{el}C_{ep}$, $C_{ep}S_{el}M_{el}M_{el}S_{el}C_{ep}$, $C_{ep}C_{el}M_{el}C_{el}C_{ep}$ and $C_{ep}S_{el}M_{el}C_{el}C_{ep}$; wherein "C" is a carded fabric layer, "S" is a spunbond fabric layer, and "M" is a meltblown fabric layer, and wherein "el" is a fabric made from elastic material, and "ep" is an extensible, non-elastic fabric made from a blend of plastic and elastic materials. In other embodiments, there may be two, three or more extensible, non-elastic fabric layers on either side of the elastic layer(s), such as represented by, for example, $C_{ep}C_{ep}S_{el}M_{el}C_{el}C_{ep}C_{ep}$.

The various descriptive elements and numerical ranges disclosed herein can be combined with other descriptive elements and numerical ranges to describe preferred embodiments of the facing layers and multilayer fabrics; further, any upper numerical limit of an element can be combined with any lower numerical limit of the same element to describe preferred embodiments. In this regard, the phrase "within the range from X to Y" is intended to include within that range the "X" and "Y" values.

DETAILED DESCRIPTION

Disclosed is a nonwoven fabric that is soft and extensible and can be used as a facing layer—a layer of material that may come into human skin contact and site—for an elastic structure such as a multilayer nonwoven that may be used as an elastic component of a hygiene, absorbent or other article. The facing layers are desirably extensible and non-elastic as well as breathable and comprise a composition of a plastic, preferably a plastic such as polypropylene, and a propylene-α-olefin elastomer. The facing layers not only have aesthetic appeal, but are soft as evidenced by a desirably low Handle-O-Meter value. In certain embodiments, a 35 g/m² facing layer has a Handle-O-Meter value of less than 60 or 50 g. The composition that makes up the facing layer has a Flexural Modulus (1% Secant) of less than 1000 MPa in one embodiment, or within the range of from 500 or 600 or 700 to 1000 MPa. The facing layer composition has a Tensile at yield of greater than 24 MPa in another embodiment. The combination of properties provides a desirable feel and extensibility to the facing layers described herein.

As used herein, a "nonwoven fabric" (or "fabric" as used herein) is a textile structure (e.g., a sheet, web or batt) of directionally or randomly orientated fibers, without a yarn being first made. The fabrics described herein comprise a network of fibers or continuous filament yarns strengthened by mechanical, chemical, or thermally interlocking processes. A "multilayer fabric" comprises at least two fabric layers; as used herein, a "layer" refers to a fabric. A "fiber" is a material whose length is very much greater than its diameter or breadth; the average diameter is on the order of 0.01 to 200 μm, and comprises natural and/or synthetic materials. Fibers can be mono-component or bi-component (having a sheath layer and one or more different inner layer(s)); in a particular embodiment the fibers are mono-component.

As used herein, "bound" (or "bond" or "adhered") means that two or more fabrics, or a plurality of fibers, is secured to one another through i) the inherent tendency of the molten or non-molten materials' ability to adhere through chemical interactions and/or ii) the ability of the molten or non-molten fibers and/or fabric to entangle with the fibers comprising another material to generate a linkage between the fibers or fabrics. Adhesives may be used to facilitate bonding of fabric layers, but in a particular embodiment, adhesives are absent from the fabric layers (not used to bond the fibers of a fabric) described herein; and in another embodiment, absent from the multilayer fabrics (not used to bond adjacent fabric layers) described herein. Examples of adhesives include those comprising low weight average molecular weight (<80,000 g/mole) polyolefins, polyvinyl acetate polyamide, hydrocarbon resins, natural asphalts, styrenic rubbers, and blends thereof.

Disclosed in one embodiment is a multilayer fabric comprising one or more facing layers and one or more elastic layers adjacent to or sandwiched there between, the one or more facing layers comprising a polypropylene; and within the range from 0.1 or 5 to 25 or 30 wt %, by weight of the facing layer, of a propylene-α-olefin elastomer having an MFR of less than 80 dg/min, a triad tacticity of 75% or more, and comonomer-derived content within the range from 5 to 18 wt %, by weight of the propylene-α-olefin elastomer. The propylene-α-olefin elastomer may be described in any number of ways as outlined further herein. In one embodiment, the multilayer fabric consists essentially of one or more facing layers and one or more elastic layers sandwiched there between. In another embodiment, the facing layer consists essentially of the polypropylene and the propylene-α-olefin elastomer. By "consist essentially of," what is meant is that additives up to 3 or 4 wt % by weight of the multilayer fabric or the facing layer may also be present. In certain embodiments, the facing layer composition has an MFR within the range from 10 or 15 to 24 or 30 or 40 dg/min, and less than 40 or 50 or 60 or 80 dg/min in other embodiments.

As used herein, "additives" include, for example, stabilizers, surfactants, antioxidants, anti-ozonants (e.g., thioureas), fillers, migrating (preventative) agent, colorants, nucleating agents, anti-block agents, UV-blockers/absorbers, hydrocarbon resins (e.g., Oppera™ resins), oils (e.g., paraffinic, mineral, aromatic, synthetic), slip additives, and combinations thereof. Primary and secondary antioxidants include, for example, hindered phenols, hindered amines, and phosphates. Slip agents include, for example, oleamide and erucamide. Examples of fillers include carbon black, clay, talc, calcium carbonate, mica, silica, silicate, and combinations thereof. Other additives include dispersing agents and catalyst deactivators such as calcium stearate, hydrotalcite, and calcium oxide, and/or other acid neutralizers known in the art.

As used herein, materials and/or fabrics referred to as being "elastic" are those that can stretch and recover such that they exhibit an Ultimate Tensile Strength of greater than 5.5 MPa, an Ultimate Elongation of at least 200% and Tension Set of less than 20% at 100% deformation, as determined by ASTM D412. A material, such as a fabric, is "extensible" if upon application of a biasing force the material can stretch to an elongated length of at least 110% of its relaxed, original length without rupture or breakage, but upon release of the biasing force the material shows less than 40% recovery of its elongation. Extensible fabrics are formed from a material that is extensible (e.g., polyurethanes, styrenic block copolymers, ethylene vinyl acetates, certain polypropylene copolymers, polyethylenes, and blends thereof), or formed by mechanically distorting or twisting a fabric (natural or synthetic). In certain embodiments, the facing layers described herein are extensible, and are extensible and non-elastic in a particular embodiment.

The one or more elastic layers may comprise (or consist essentially of) any material that is elastic, examples of which include propylene-α-olefin elastomer, natural rubber (NR), synthetic polyisoprene (IR), butyl rubber (copolymer of isobutylene and isoprene, IIR), halogenated butyl rubbers (chloro-butyl rubber: CIIR; bromo-butyl rubber: BIIR), polybutadiene (BR), styrene-butadiene rubber (SBR), nitrile rubber, hydrogenated nitrile rubbers, chloroprene rubber (CR), polychloroprene, neoprene, EPM (ethylene-propylene rubber) and EPDM rubbers (ethylene-propylene-diene rubber), epichlorohydrin rubber (ECO), polyacrylic rubber (ACM, ABR), silicone rubber, fluorosilicone rubber, fluoroelastomers, perfluoroelastomers, polyether block amides (PEBA), chlorosulfonated polyethylene (CSM), ethylene-vinyl acetate (EVA), thermoplastic elastomers (TPE), thermoplastic vulcanizates (TPV), thermoplastic polyurethane (TPU), thermoplastic olefins (TPO), polysulfide rubber, or blends of any two or more of these elastomers. In certain embodiments, the one or more elastic layers comprise propylene-α-olefin elastomer, styrene-butadiene rubber, or blends thereof. In yet other embodiments, the one or more elastic layers consist essentially of propylene-α-olefin elastomer(s). In a particular embodiment, styrenic-based elastomers (polymers comprising at least 10 wt % styrene or substituted-styrene-derived units) are absent from the multilayer fabric.

As used herein, a "film" is defined as a flat unsupported section of a plastic and/or elastomeric material whose thickness is very thin in relation to its width and length and has a continuous or nearly continuous non-porous macroscopic morphology throughout its thickness and length allowing for the passage of air at diffusion-limited rates or lower. The multilayer fabrics described herein may include one or more film layers and can comprise any material as described herein for the fabrics. In certain embodiments, films are absent from the multilayer fabrics described herein.

As used herein, "polypropylene" refers to a propylene homopolymer, or a copolymer of propylene, or some mixture of propylene homopolymers and copolymers. In certain embodiments, the polypropylene described herein is predominately crystalline, thus the polypropylene may have a melting point ($T_m$) greater than 110° C. or 115° C. or 130° C. The term "crystalline," as used herein, characterizes those polymers which possess high degrees of inter- and intramolecular order. In certain embodiments the polypropylene has a heat of fusion ($H_f$) greater than 60 J/g or 70 J/g or 80 J/g, as determined by DSC analysis. The heat of fusion is dependent on the composition of the polypropylene; the thermal energy for the highest order of polypropylene is estimated at 189 J/g that is, 100% crystallinity is equal to a heat of fusion of 189 J/g. A polypropylene homopolymer will have a higher heat of fusion than a copolymer or blend of homopolymer and copolymer.

In certain embodiments, the polypropylene(s) are isotactic. Isotacticity of the propylene sequences in the polypropylenes can be achieved by polymerization with the choice of a desirable catalyst composition. The isotacticity of the polypropylenes as measured by $^{13}C$ NMR, and expressed as meso diad content is greater than 90% (meso diads [m]>0.90) or 95% or 97% or 98% in certain embodiments, determined as in U.S. Pat. No. 4,950,720 by $^{13}$C NMR. Expressed another way, the isotacticity of the polypropylenes as measured by $^{13}$C NMR, and expressed as pentad content, is greater than 93% or 95% or 97% in certain embodiments.

The polypropylene can vary widely in composition. For example, substantially isotactic polypropylene homopolymer or propylene copolymer containing equal to or less than 10 wt % of other monomer, that is, at least 90 wt % by weight propylene can be used. Further, the polypropylene can be present in the form of a graft or block copolymer, in which the blocks of polypropylene have substantially the same stereoregularity as the propylene-α-olefin copolymer so long as the graft or block copolymer has a sharp melting point above 110° C. or 115° C. or 130° C., characteristic of the stereoregular propylene sequences. The polypropylene may be a combination of homopolypropylene, and/or random, and/or block copolymers as described herein. When the polypropylene is a random copolymer, the percentage of the α-olefin derived units in the copolymer is, in general, up to 5% by weight of the polypropylene, 0.5% to 5% by weight in another embodiment, and 1% to 4% by weight in yet another embodiment. The preferred comonomer derived from ethylene or α-olefins containing 4 to 12 carbon atoms. One, two or more comonomers can be copolymerized with propylene. Exemplary α-olefins may be selected from the group consisting of ethylene; 1-butene; 1-pentene-2-methyl-1-pentene-3-methyl-1-butene; 1-hexene-3-methyl-1-pentene-4-methyl-1-pentene-3,3-dimethyl-1-butene; 1-heptene; 1-hexene; 1-methyl-1-hexene; dimethyl-1-pentene; trimethyl-1-butene; ethyl-1-pentene; 1-octene; methyl-1-pentene; dimethyl-1-hexene; trimethyl-1-pentene; ethyl-1-hexene; 1-methylethyl-1-pentene; 1-diethyl-1-butene; propyl-1-pentene; 1-decene; methyl-1-nonene; 1-nonene; dimethyl-1-octene; trimethyl-1-heptene; ethyl-1-octene; methylethyl-1-butene; diethyl-1-hexene; 1-dodecene and 1-hexadodecene.

The weight average molecular weight (Mw) of the polypropylene can be between 50,000 to 3,000,000 g/mol, or from 90,000 to 500,000 g/mol in another embodiment, with a molecular weight distribution (MWD, Mw/Mn) within the range from 1.5 to 2.5 or 3.0 or 4.0 or 5.0 or 20.0 in certain embodiments. The polypropylene has an MFR (2.16 kg/230° C.) within the range from 10 or 15 or 18 to 30 or 35 or 40 or 50 dg/min in certain embodiments.

There is no particular limitation on the method for preparing the polypropylenes described herein. However, for example, the polymer is a propylene homopolymer obtained by homopolymerization of propylene in a single stage or multiple stage reactor. Copolymers may be obtained by copolymerizing propylene and ethylene or an α-olefin having from 4 to 20 carbon atoms in a single stage or multiple stage reactor. Polymerization methods include, but are not limited to, high pressure, slurry, gas, bulk, or solution phase, or a combination thereof, using any suitable catalyst such as traditional Ziegler-Natta catalyst or a single-site, metallocene catalyst system, or combinations thereof including bimetallic (i.e, Ziegler-Natta and metallocene) supported catalyst systems.

Exemplary commercial polypropylenes include the family of Achieve™ polymers (ExxonMobil Chemical Company, Baytown, Tex.). The Achieve polymers are produced based on metallocene catalyst system. In certain embodiments, the metallocene catalyst system produces a narrow molecular weight distribution polymer. The MWD is typically in the range of 1.5 to 2.5. However, a broader MWD polymer may be produced in a process with multiple reactors. Different MW polymers can be produced in each reactor to broaden the MWD. Achieve polymer such as Achieve 3854, a homopolymer having an MFR of 24 dg/min can be used as a blend component described herein. Alternatively, an Achieve polymer such as Achieve 6936G1, a 1500 dg/min MFR homopolymer, can be used as a blend component described herein. Other polypropylene random copolymer and impact copolymer may also be used. The choice of polypropylene MFR can be used as means of adjusting the final MFR of the blend, especially the facing layer composition. Any of the polypropylenes described herein can be modified by controlled rheology to improve spinning performance as is known in the art.

Although the "polypropylene" component of the fiber and fabric compositions is sometimes discussed as a single polymer, also contemplated by the term are blends of two or more different polypropylenes having the properties within the ranges described herein. In certain embodiments, the polypropylene may be present in the fabric layer (or fabric layer composition) within the range from 75 or 70 to 80 or 90 or 95 or 99 or 99.9 wt %, by weight of the fabric layer/composition.

As used herein, a "propylene-α-olefin elastomer" refers to a random copolymer that is elastomeric, has moderate crystallinity and possesses propylene-derived units and one or more units derived from ethylene, higher α-olefins and/or optionally diene-derived units. The overall comonomer content of the copolymer is from 5 to 35 wt % in one embodiment. In some embodiments, where more than one comonomer is present, the amount of a particular comonomer may be less than 5 wt %, but the combined comonomer content is greater than 5 wt %. The propylene-α-olefin elastomers may be described by any number of different parameters, and those parameters may comprise a numerical range made up of any desirable upper limit with any desirable lower limit as described herein.

In certain embodiments, the propylene-α-olefin elastomer comprises ethylene or $C_4$-$C_{10}$ α-olefin-derived units (or "comonomer-derived units") within the range of 5 or 7 or 9 to 13 or 16 or 18 wt % by weight of the elastomer. The propylene-α-olefin elastomer may also comprise two different comonomer-derived units. Also, these copolymers and terpolymers may comprise diene-derived units as described below. In a particular embodiment, the propylene-α-olefin elastomer comprises propylene-derived units and comonomer units selected from ethylene, 1-hexene and 1-octene. And in a more particular embodiment, the comonomer is ethylene, and thus the propylene-α-olefin elastomer is a propylene-ethylene copolymer. When dienes are present, the propylene-α-olefin elastomer comprises less than 5 or 3 wt %, by weight of the elastomer, of diene derived units, or within the range from 0.1 or 0.5 or 1 to 5 wt % in other embodiments. Suitable dienes include for example: 1,4-hexadiene, 1,6-octadiene, 5-methyl-1,4-hexadiene, 3,7-dimethyl-1,6-octadiene, dicyclopentadiene (DCPD), ethylidiene norbornene (ENB), norbornadiene, 5-vinyl-2-norbornene (VNB), and combinations thereof.

In certain embodiments, the propylene-α-olefin elastomers have a triad tacticity of three propylene units, as measured by $^{13}$C NMR, of 75% or greater, 80% or greater, 82% or greater, 85% or greater, or 90% or greater. In one embodiment, the triad tacticity is within the range from 50 to 99%, and from 60 to 99% in another embodiment, and from 75 to 99% in yet another embodiment, and from 80 to 99% in yet another embodiment; and from 60 to 97% in yet another embodiment. Triad tacticity is determined as follows: The tacticity index, expressed herein as "m/r", is determined by $^{13}$C nuclear magnetic resonance (NMR). The tacticity index m/r is calculated as defined by H. N. Cheng in 17 MACROMOLECULES 1950 (1984). The designation "m" or "r" describes the stereochemistry of pairs of contiguous propylene groups, "m" referring to meso and "r" to racemic. An m/r ratio of 1.0 generally describes a syndiotactic polymer, and an m/r ratio of 2.0 an atactic material. An isotactic material theoretically may have a ratio approaching infinity, and many by-product atactic polymers have sufficient isotactic content to result in ratios of greater than 50. Embodiments of the propylene-α-olefin elastomer have a tacticity index m/r ranging from a lower limit of 4 or 6 to an upper limit of 8 or 10 or 12.

In certain embodiments, the propylene-α-olefin elastomers have a heat of fusion ($H_f$), determined according to the Differential Scanning Calorimetry (DSC) procedure described herein within the range from 0.5 or 1 or 5 J/g, to 35 or 40 or 50 or 65 or 75 J/g. In certain embodiments, the $H_f$ value is less than 75 or 60 or 50 or 40 J/g. In certain embodiments, the propylene-α-olefin elastomers have a percent crystallinity within the range from 0.5 to 40%, and from 1 to 30% in another embodiment, and from 5 to 25% in yet another embodiment, wherein "percent crystallinity" is determined according to the DSC procedure described herein. The thermal energy for the highest order of polypropylene is estimated at 189 J/g (i.e., 100% crystallinity is equal to 189 J/g). In another embodiment, the propylene-α-olefin elastomer has a crystallinity of less than 40%, and within the range from 0.25 to 25% in another embodiment, and from 0.5 to 22% in yet another embodiment, and from 0.5 to 20% in yet another embodiment.

In certain embodiments, the propylene-α-olefin elastomers have a single peak melting transition as determined by DSC; in certain embodiments the propylene-α-olefin elastomer has a primary peak melting transition at from less than 90° C., with a broad end-of-melt transition at greater than about 110° C. The peak "melting point" ($T_m$) is defined as the temperature of the greatest heat absorption within the range of melting of the sample. However, the propylene-α-olefin elastomer may show secondary melting peaks adjacent to the principal peak, and/or the end-of-melt transition, but for purposes herein, such secondary melting peaks are considered together as a single melting point, with the highest of these peaks being considered the $T_m$ of the propylene-α-olefin elastomer. The propylene-α-olefin elastomers have a peak melting temperature ($T_m$) from less than 70 or 80 or 90 or 100 or 105° C. in certain embodiments; and within the range from 10 or 15 or 20 or 25 to 65 or 75 or 80 or 95 or 105° C. in other another embodiments.

The procedure for DSC determinations is as follows. About 0.5 grams of polymer was weighed out and pressed to a thickness of about 15-20 mils (about 381-508 microns) at about 140° C.-150° C., using a "DSC mold" and Mylar™ as a backing sheet. The pressed pad was allowed to cool to ambient temperature by hanging in air (the Mylar was not removed). The pressed pad was annealed at room temperature (about 23-25° C.) for about 8 days. At the end of this period, an about 15-20 mg disc was removed from the pressed pad using a punch die and was placed in a 10 microliter aluminum sample pan. The sample was placed in a differential scanning calorimeter (Perkin Elmer Pyris 1 Thermal Analysis System) and was cooled to about −100° C. The sample was heated at about 10° C./min to attain a final temperature of about 165° C. The thermal output, recorded as the area under the melting peak of the sample, is a measure of the heat of fusion and can be expressed in Joules per gram (J/g) of polymer and was automatically calculated by the Perkin Elmer System. Under these conditions, the melting profile shows two (2) maxima, the maxima at the highest temperature was taken as the melting point within the range of melting of the sample relative to a baseline measurement for the increasing heat capacity of the polymer as a function of temperature.

In certain embodiments, the propylene-α-olefin elastomers have a density within the range from 0.840 to 0.920 g/cm$^3$, and from 0.845 to 0.900 g/cm$^3$ in another embodiment, and from 0.850 to 0.890 g/cm$^3$ in yet another embodiment, the values measured at room temperature per the ASTM D-1505 test method.

In certain embodiments, the propylene-α-olefin elastomers have a melt flow rate ("MFR," ASTM D1238, 2.16 kg, 230° C.), from less than 80 or 70 or 50 or 40 or 30 dg/min, and within the range from 1 or 4 or 6 to 12 or 16 or 20 or 40 or 60 or 80 dg/min in other embodiments.

In certain embodiments, the propylene-α-olefin elastomers have a Shore A hardness (ASTM D2240) within the range from 20 or 40 to 80 or 90 Shore A. In yet another embodiment, the propylene-α-olefin elastomers possess an Ultimate Elongation (ASTM D 412) of greater than 500% or 1000% or 2000%; and within the range from 500% to 800 or 1200 or 1800 or 2000 or 3000% in other embodiments.

In certain embodiments, the propylene-α-olefin elastomers have a weight average molecular weight (Mw) value within the range from 50,000 to 1,000,000 g/mole, and from 60,000 to 600,000 in another embodiment, and from 70,000 to 400,000 in yet another embodiment. The propylene-α-olefin elastomers have a number average molecular weight (Mn) value within the range from 10,000 to 500,000 g/mole in certain embodiments, and from 20,000 to 300,000 in yet another embodiment, and from 30,000 to 200,000 in yet another embodiment. The propylene-α-olefin elastomers have a z-average molecular weight (Mz) value within the range from 80,000 to 6,000,000 g/mole in certain embodiments, and from 100,000 to 700,000 in another embodiment, and from 120,000 to 500,000 in yet another embodiment.

In certain embodiments, a desirable molecular weight (and hence, a desirable MFR) is achieved by visbreaking the propylene-α-olefin elastomer. The "visbroken propylene-α-olefin elastomer" (also known in the art as "controlled rheology") is the copolymer that has been treated with a visbreaking agent such that the agent breaks apart the polymer chains. Non-limiting examples of visbreaking agents include peroxides, hydroxylamine esters, and other oxidizing and free-radical generating agents. Stated another way, the visbroken elastomer may be the reaction product of a visbreaking agent and the elastomer. In particular, a visbroken propylene-α-olefin elastomer is one that has been treated with a visbreaking agent such that its MFR is increased, in one embodiment by at least 10%, and at least 20% in another embodiment relative to the MFR value prior to treatment. In certain embodiments, the process of making the fibers and fabrics excludes any visbreaking agents from the extruder and other parts of the apparatus. The propylene-α-olefin elastomer therefrom is called a "reactor grade" elastomer. By "excludes" or "excluded," what is meant is that visbreaking agents such as peroxides, hydroxylamine esters, and other oxidizing and free-radical generating agents are not added to the extruder or any other component of the fiber forming apparatus downstream of the extruder. Thus, in this embodiment the elastomer being blown into a fiber and fabric is the elastomer having the desired MFR as introduced into the extruder feeding the fiber forming apparatus.

In certain embodiments, the molecular weight distribution (MWD) of the propylene-α-olefin elastomers is within the range from 1.5 or 1.8 or 2.0 to 3.0 or 3.5 or 4.0 or 5.0. Techniques for determining the molecular weight (Mn, Mz and Mw) and molecular weight distribution (MWD) are as follows, and as in Verstate et al. in 21 MACROMOLECULES 3360 (1988). Conditions described herein govern over published test conditions. Molecular weight and molecular weight distribution are measured using a Waters 150 gel permeation chromatograph equipped with a Chromatix KMX-6 on-line light scattering photometer. The system was used at 135° C. with 1,2,4-trichlorobenzene as the mobile phase. Showdex™ (Showa-Denko America, Inc.) polystyrene gel columns 802, 803, 804 and 805 are used. This technique is discussed in LIQUID CHROMATOGRAPHY OF POLYMERS AND RELATED MATERIALS III 207 (J. Cazes ed., Marcel Dekker, 1981). No corrections for column spreading were employed; however, data on generally accepted standards, for example, National Bureau of Standards, Polyethylene (SRM 1484) and anionically produced hydrogenated polyisoprenes (an alternating ethylene-propylene copolymer) demonstrate that such corrections on Mw/Mn or Mz/Mw are less than 0.05 units. Mw/Mn was calculated from an elution time-molecular weight relationship whereas Mz/Mw was evaluated using the light scattering photometer. The numerical analyses can be performed using the commercially available computer software GPC2, MOLWT2 available from LDC/Milton Roy-Riviera Beach, Fla.

The propylene-α-olefin elastomers described herein can be produced using any catalyst and/or process known for producing polypropylenes. In certain embodiments, the propylene-α-olefin elastomers can include copolymers prepared according to the procedures in WO 02/36651, U.S. Pat. No. 6,992,158, and/or WO 00/01745. Preferred methods for producing the propylene-α-olefin elastomers are found in US Patent Application Publication 2004/0236042 and U.S. Pat. No. 6,881,800. Preferred propylene-α-olefin elastomers are available commercially under the trade names Vistamaxx™ (ExxonMobil Chemical Company, Houston, Tex., USA) and Versify™ (The Dow Chemical Company, Midland, Mich., USA), certain grades of Tafmer™ XM or Notio™ (Mitsui Company, Japan) or certain grades of Softel™ (Basell Polyolefins of the Netherlands).

Although the "propylene-α-olefin elastomer" component of the fiber and fabric compositions is sometimes discussed as a single polymer, also contemplated by the term are blends of two or more different propylene-α-olefin elastomers having the properties within the ranges described herein.

The facing fabric layer(s) (or "facing layer(s)") described herein can be made by any suitable means such as by dry-laid processes, wet-laid processes, web-bonding processes, extrusion-formed webs (or "spunlaid nonwovens"), or a combination of these methods. The dry-laid processes include mechanical means, such as how carded fabrics are produced, and aerodynamic means, such as, air-laid methods. Dry-laid nonwovens are made with staple fiber processing machinery such as cards and garnetts, which are designed to manipulate staple fibers in the dry state. Also included in this category are nonwovens made from filaments in the form of tow, and fabrics composed of staple fibers and stitching filaments or yarns, namely, stitchbonded nonwovens. Fabrics made by wet-laid processes made with machinery associated with pulp fiberizing, such as hammer mills, and paperforming. Web-bonding processes can be described as being chemical processes or physical processes. Chemical bonding refers to the use of water-based and solvent-based polymers to bind together the fibrous webs. These binders can be applied by saturation (impregnation), spraying, printing, or application as a foam. Physical bonding processes include thermal processes such as calendering and hot air bonding, and mechanical processes such as needling and hydroentangling. Spunlaid nonwovens are made in one continuous process: fibers are spun by melt extrusion and then directly dispersed into a web by deflectors or can be directed with air streams. Spunlaid technology is used to produce spunbond, meltblown and porous-film nonwovens. These fabrics are made with machinery associated with polymer extrusion methods such as melt-spinning, film casting and extrusion coating. In certain embodiments, the facing layer(s) are carded or spunbond.

More particularly, "carding" is the process of disentangling, cleaning, and intermixing fibers to make a web for further processing into a nonwoven fabric and is well known in the art. The fabric, or "layer" of fabric, is called a "carded" fabric or layer when made using this process. The aim is to take a mass of fiber tufts and produce a uniform, clean web. An example of a method of carding is described in U.S. Pat. No. 4,105,381. The process predominantly aligns the fibers which are held together as a web by mechanical entanglement and fiber-fiber friction. The main type of card is a roller card. The carding action is the combing or working of fibers between the points of saw-tooth wire clothing on a series of interworking card rollers. Short fibers and foreign bodies are removed, the fiber tufts are opened, and the fibers are arranged more or less parallel. The carding or parallelization of fibers occurs when one of the surfaces moves at a speed greater than the other. Fibers are removed, or "stripped," when the points are arranged in the same direction and the more quickly moving surface removes or transfers the fibers from the more slowly moving surface.

High speed cards designed to produce nonwoven webs may be configured with one or more main cylinders, roller or stationary tops, one or two doffers, or various combinations of these principal components. Single-cylinder cards are usually used for products requiring machine-direction or parallel-fiber orientation. Double-cylinder cards (or "tandem" cards) are basically two single-cylinder cards linked together by a section of stripper and feed rolls to transport and feed the web from the first working area to the second. The coupling of two carding units in tandem distributes the working area and permits greater fiber throughput at web quality levels comparable to slower single-cylinder machines. Roller-top cards have five to seven sets of workers and strippers to mix and card the fibers carried on the cylinder. The multiple transferring action and re-introduction of new groupings of fibers to the carding zones provides a doubling effect which enhances web uniformity. Stationary-top cards have strips of metallic clothing mounted on plates positioned concavely around the upper periphery of the cylinder. The additional carding surfaces thus established provide expanded fiber alignment with minimum fiber extraction.

"Spunbond" fabrics are filament sheets made through an integrated process of spunbonding, which includes the steps of spinning the molten polymer, air attenuation, deposition (on a drum or other moving base to allow formation of the web, or onto another fabric(s)) and bonding. The method of spunbonding is well known and described generally in, for example, POLYPROPYLENE HANDBOOK 314-324 (E. Moore, Hanser Verlag, 1996). Such fibers range from 5 to 150 μm in average diameter in certain embodiments, and within a range of 10 to 40 or 50 or 100 μm in particular embodiments. A combination of thickness, fiber fineness (denier), and number of fibers per unit area determines the fabric basis weight which ranges from 8 or 10 or 15 to 50 or 80 or 120 or 400 or 800 g/m$^2$ in particular embodiments. Most spunbonded processes yield a fabric having planar-isotropic properties owing to the random laydown of the fibers. Spunbonded fabrics are generally nondirectional and can be cut and used without concern for higher stretching in the bias direction or unraveling at the edges. It is possible to produce nonisotropic properties by controlling the orientation of the fibers in the web during laydown. Fabric thickness varies from 0.1 to 4.0 mm, and within the range from 0.15 to 1.5 mm in particular embodiments. The method of bonding affects the thickness of the sheets, as well as other characteristics. In particular embodiments, adhesives are absent as bonding agents; thermal-type bonding is preferred. Fiber webs bonded by thermal calendering are thinner than the same web that has been needle-punched, because calendering compresses the structure through pressure, whereas needle-punching moves fibers from the x-y plane of the fabric into the z (thickness) direction.

The elastic layer and other layers of the multilayer fabrics described herein may be produced by any suitable process such as spunbond or meltblown processes. "Meltblown" fabrics are well known and differ from the traditional spun-bonded fabrics by having lower fiber denier (fineness) and by usually being composed of discontinuous filaments. The method of melt blowing is well known and also described in POLYPROPYLENE HANDBOOK. Although meltblown fabrics are not generally referred to as spunbonded, the integration of spinning, attenuation (although slight), laydown, and bonding during the production of meltblown webs describes a process traditionally defined as spun bonding. The inherent fiber entanglement often makes additional bonding unnecessary, however. Fibers produced by melt blowing are very fine, having typical diameters of less than 7 μm, typically smaller than spunbonded fibers. The fibers are extremely fine and largely unoriented, causing the webs to be quite weak and easily distorted. In the manufacture of meltblown fabrics, a special die is used in which heated, pressurized air attenuates the molten polymer filament as it exits the orifice of the dye or nozzle. Air temperatures range from 260 to 480° C. with sonic velocity flow rates. The melt pressure within the die itself may be greater than 500 psi (3.45 MPa), allowing for relatively low melt flow rate (less than 30 dg/min) polymers to be meltblown without visbreaking.

Suitable fibers that make up the facing layer may be produced on a partially oriented yarn (POY) line. In melt spinning on POY lines, the desired composition is generally melted using one or more screw extruders. The extruder delivers molten composition at a constant rate into a filter assembly. In the filter assembly the molten composition is filtered through a series of sintered or fibrous gauzes or a bed of grade fine refractory material, such as sand or alumina, held in place by metal screens.

After filtration, the molten composition passes to the spinneret through a distribution system, arranged to maximize mixing, equalize temperature, and minimize stagnancy. Dynamic mixers, static mixers, or flow inverters are sometimes included in the spinning apparatus to improve the homogeneity of the molten composition between spinning positions. Spinnerets for continuous yarn production may have up to about 500 holes, most commonly 50 to 200, and those for tow or staple fiber may have thousands. For continuous yarn or staple fiber production, the spinneret holes measure between 0.3 to 0.5 mm in diameter. For monofilaments, the spinnerets typically have only a few relatively large holes, from 1 to 4 mm in diameter. The spinneret holes for monofilaments are usually round, but may have other cross-sections, for example, multi-lobal or rectangular.

Typical extrusion temperatures for the facing layer composition(s) are from 225 to 300° C. The actual temperature used is dependent on the size of the polymer with larger lighter molecular weight polymers requiring higher temperatures to achieve a sufficiently low melt viscosity for extrusion. As molten composition passes through a spinneret hole, it is drawn away and attenuated by a draw-down force applied by a forwarding or windup roll; simultaneously its temperature rapidly decreases. The diameter of the fiber immediately below the hole and before attenuation begins may be larger than the hole diameter. This so-called "die swell" is due to relaxation of the viscoelastic stress induced in the hole.

In the case of continuous yarn, after spinning the fiber is cooled, generally by blowing cool air on the fiber. In the case of monofilaments, because heat removal is more of a problem, the fiber is usually quenched by passing it into cold water or on to a cold quench roll immediately after extrusion. For continuous yarn, the orientation of the spun yarn depends upon the speed at which it is forward spun. Generally, speeds below about 1500 m/min are employed to make spun yarn of low orientation and above about 2500 m/min to make partially oriented yarn. The orientation increases progressively up to about 6000 m/min. At higher speeds, other stress-induced processes prevent further orientation.

The fibers having a low orientation must be drawn to a relatively high draw ratio (4 to 7) to produce so-called fully oriented yarn. Drawing may be carried out as a separate step in which the spun yarn is first wound up onto a bobbin, or it may be integrated with spinning as a spin-draw process in such a way that the yarn is removed from the spinning zone relatively slowly, forwarded to a drawing zone (or two or more successive drawing zones) in which it oriented, and finally wound up at a high speed, for example, 6000 m/min.

In POY, the feedstock for draw texturing or warp drawing (draw beaming) is usually wound up at speeds of 2500 to 4000 m/min. Spin-draw processes for untextured filament yarns may also be based upon forwarding partly oriented yarn from the spinning zone at speeds of this order, drawing them in line to a draw ratio of 1.5 to 2, and finally winding up at from 1,000 to 6,000 m/min or more. Integrated spin-draw-texture processes may also be carried out. Highly oriented yarns can be wound up directly from the spinning zone at very high speeds up to 6000 m/min; such yarns can be used in textiles without further drawing, but the orientation is generally not as high as that achieved by a two stage process with high draw ratio. In spinning tows for conversion into staple fiber or tops, the numbers of fibers from a single spinneret may be several thousand. The fibers from a large number of individual spinnerets are converged by forwarding them together from capstan rollers as a large tow, which is collected by forwarding it into a transfer can and transported to a separate drawing stage.

The fibers that form the facing layer(s) are strong, thus making them suitable for elastic articles. In one embodiment, the fiber forming the facing layer has a Tenacity of greater than 0.60 g/den at a spin speed of 2000 m/min; and a Tenacity of greater than 2.0 g/den at a spin speed of 1500 m/min in another embodiment. In yet another embodiment, the fiber forming the facing layer has an Elongation of greater than 100% at a spin speed of 2000 m/min; and an Elongation of greater than 120% at a spin speed of 1500 m/min in yet another embodiment. Further, the fibers that make up the facing layer have an Elongation at Break of greater than 600% in other embodiments.

In certain embodiments, the facing layer further comprises within the range from 0.1 to 10 wt %, by weight of the facing layer, of high density polyethylene (HDPE), which has a density of greater than 0.945 g/cm$^3$. In particular embodiments, polyethylenes are absent from the facing layer. "Polyethylenes" are polymers that comprise greater than 50 wt %, by weight of the polymer, of ethylene-derived units, and includes ethylene-propylene rubbers, so called "plastomers," etc.

The multilayer fabrics may be formed by any suitable means of combining the various layers together, wherein any two or more layers may be bound to one another. Each layer may be individually formed, then bound together, or some layers may be formed on others as by melt blowing or spunbonding of fibers directly onto a passing pre-made fabric, and combinations of methods. In one embodiment one or more facing layers are combined with one or more elastic layers adjacent to or sandwiched there between to form the multilayer fabrics. In certain embodiments, the layers are adhered to one another through a heated calendaring means (e.g., one, two or more embossed or smooth calendar rolls making contact, preferably pressured contact, with the layers of fabric), the temperature set to a level that will cause the layers to adhere to one another at the desired level. In one embodiment the calendaring temperature is less than 105 or 100 or 95° C., and within the range from 60 to 95 or 100 or 105° C. in other embodiments. The multilayer fabric is activated by a mechanical activation means, such as by using a ring roll, in certain embodiments. Embodiments of suitable activation means are described in U.S. Pat. No. 5,366,782. Activation may take place in the CD, MD or both directions. The activation makes the fabric suitable for elastic articles.

The multilayer fabrics that can be formed from the carded and/or spunbond facing layer are not limited. At a minimum, the structure includes a facing layer adjacent to (and in a particular embodiment, bound to) at least one elastic layer. This can be represented by, for example: $S_{ep}M_{el}$ and $C_{ep}M_{el}$; wherein "C" represents a carded fabric layer, "S" represents a spunbond fabric layer, and "M" represents a meltblown fabric layer, and wherein "el" is a fabric made from elastic material, and "ep" is an extensible, non-elastic fabric made from a blend of plastic and elastic materials. The term "adjacent" does not exclude one or more fabric and/or film layer(s) being between "adjacent" layers. Other fabric and/or film layers may also be present here and in other representations unless noted otherwise, but in certain embodiments, film layers are absent. In another embodiment, at least one elastic layer is sandwiched between two carded and/or spunbond facing layers. This can be represented by, for example: $S_{ep}M_{el}S_{ep}$, $C_{ep}M_{el}C_{ep}$ and $C_{ep}M_{el}S_{ep}$. In certain embodiments, the multilayer fabric has a layered structure selected from the group consisting of structures represented by: $S_{ep}S_{el}M_{el}M_{el}S_{ep}$, $S_{ep}S_{el}M_{el}S_{el}S_{ep}$, $S_{ep}S_{el}M_{el}S_{el}C_{ep}$, $C_{ep}S_{el}M_{el}S_{el}C_{ep}$, $S_{ep}S_{el}M_{ep}S_{el}S_{ep}$, $S_{ep}S_{el}M_{ep}S_{el}C_{ep}$, $C_{ep}S_{el}M_{ep}S_{el}C_{ep}$, $C_{ep}S_{el}M_{el}M_{el}S_{el}C_{ep}$, $C_{ep}C_{el}M_{el}C_{el}C_{ep}$ and $C_{ep}S_{el}M_{el}C_{el}C_{ep}$. There may be multiple spunbond and/or carded extensible, non-elastic layers on one or both sides of the multilayer fabric, such as structures represented by: $S_{ep}S_{ep}M_{el}$, $C_{ep}C_{ep}M_{el}$, $C_{ep}C_{ep}C_{ep}M_{el}M_{el}$, $S_{ep}S_{ep}S_{el}M_{el}M_{el}S_{ep}$, $S_{ep}S_{ep}S_{el}M_{el}S_{el}S_{ep}S_{ep}$, $S_{ep}S_{ep}S_{el}M_{el}S_{el}C_{ep}$, $C_{ep}C_{ep}S_{el}M_{el}S_{el}C_{ep}$, $C_{ep}S_{ep}S_{el}M_{ep}S_{el}S_{ep}$, $C_{ep}S_{ep}S_{el}M_{ep}S_{el}C_{ep}C_{ep}$, $S_{ep}C_{ep}S_{el}M_{ep}S_{el}C_{ep}S_{ep}$, $S_{ep}C_{ep}S_{el}M_{el}M_{el}S_{el}C_{ep}$, $S_{ep}S_{ep}C_{ep}M_{ep}C_{el}M_{el}C_{el}C_{ep}$ and $S_{ep}S_{ep}C_{ep}S_{el}M_{el}C_{el}C_{ep}S_{ep}S_{ep}$, and variations thereof. In certain embodiments, there may be two, three, four, five, six, seven or more extensible, non-elastic fabric layers on one or both sides of the multilayer fabrics described herein, each of which may be carded, spunbond, or some combination thereof. Each such layer may be the same or different. An absorbent article can be made that comprises the multilayer fabrics described herein. Such articles include but are not limited to baby diapers, pull-ups, training pants, adult incontinence briefs, panty liners, sanitary napkins, medical garments and bandages.

EXAMPLES

The following are comparative and working examples of facing layer compositions that are formed into fibers suitable for the facing layers described herein. Table 1 shows the various polymeric components that make up the inventive and comparative examples.

TABLE 1

Polymers used in the examples

| component trade name | type of material | Melt Flow Rate (dg/min) | ethylene content (wt %) |
|---|---|---|---|
| Achieve 3854 | Polypropylene (PP) (homopolymer) | 24 | — |
| Vistamaxx 3980 | Propylene-α-olefin (PP) elastomer | 8 | 9.0 |
| Adflex V109 | Polypropylene (PP) (copolymer) | 12 | 16.9 |
| Vistalon 722 | ethylene-propylene (EP) rubber | 2 | 72 |
| HDPE | high density polyethylene | 9 | 100 |

Achieve™ 3854, Vistamaxx™ 3980, Vistalon™ 722 and High Density Polyethylene (HDPE) are available from ExxonMobil Chemical (United States). Adflex™ V109 a propylene copolymer is available from LyondellBasell (Netherlands). The formulations that make up the comparative ("C") and inventive ("E") examples are in Table 2.

TABLE 2

Example formulations

| | Unit | C1 | C2 | E1 | E2 |
|---|---|---|---|---|---|
| Formulation | | | | | |
| PP homopolymer | wt % | 75 | 75 | 75 | 80 |
| HDPE | wt % | 5 | 5 | 5 | — |
| PP copolymer | wt % | 20 | — | — | — |
| EP rubber | wt % | — | 2.5 | — | — |
| PP elastomer | wt % | — | 17.5 | 20 | 20 |
| Total | wt % | 100 | 100 | 100 | 100 |
| Composition Properties | | | | | |
| MFR | dg/min | 19.6 | 14.4 | 17.3 | 19.3 |
| 1% Sec Flex Modulus | MPa | 940 | 890 | 920 | 920 |
| Tensile at Yield | MPa | 27 | 24 | 26 | 27 |
| Elongation at Yield | % | 11 | 11 | 12 | 13.4 |
| Elongation at Break | % | 910 | 650 | 819 | 618 |

MFR was measured as per ASTM D1238, condition L, at 230° C. and 2.16 kg load using a melt indexer. The flexural modulus was measured according to ASTM D790A, using a crosshead speed of 1.27 mm/min (0.05 in/min), and a support span of 50.8 mm (2.0 in) using an Instron machine. The tensile strength at yield, elongation at yield and elongation at break were measured as per ASTM D638, with a crosshead speed of 50.8 mm/min (2.0 in/min), and a gauge length of 50.8 mm (2.0 in), using an Instron machine.

Table 2 shows the formulations comprising polypropylene homopolymer that were compounded in a 30 mm ZSK twin screw using a polypropylene melt temperature profile of 230° C. The ingredients were dry blended prior to compounding in the extruder. The compounds were injection molded into standard ASTM specimens and their tensile and flexural properties evaluated per ASTM procedure. Compound C1 was a control containing the propylene copolymer, while C2 contains the propylene-α-olefin elastomer and an ethylene-propylene (EP) copolymer. Example 1 (E1) of this invention contains the propylene-α-olefin elastomer without either the propylene copolymer or the EP copolymer.

The formulations from Table 2 were converted to a fiber on a partially oriented yarn (POY) line. An additional formulation Example 2 (E2) shown in Table 2 was a dry blend of Achieve 3854/Vistamaxx 3980 (80/20). Table 3 shows the process conditions of the fiber spinning line, having a spinneret of 72 holes, and the properties of the fiber. The maximum spin speed represented by speed to break was determined for every formulation. Fiber samples were collected and drawn on a godet at spin speeds starting at 500 m/min and in increments of 500 m/min. The properties of the fiber, notably tensile strength (tenacity) and elongation, was obtained at each speed increment.

TABLE 3

POY processing conditions and properties

| Formulation/Process Condition | C1 | C2 | E1 | E2 |
|---|---|---|---|---|
| Extruder Temperature (° C.) | | | | |
| Zone 1 | 205 | 204 | 207 | 205 |
| Zone 2 | 205 | 205 | 205 | 205 |
| Zone 3 | 232 | 232 | 232 | 232 |
| Die Zone 1 | 232 | 233 | 232 | 232 |
| Die Zone 2 | 232 | 232 | 232 | 232 |
| Die Zone 3 | 232 | 232 | 232 | 232 |
| Melt Temperature (° C.) | 232 | 232 | 232 | — |
| Extruder Current (amperes) | 2.84 | 3.99 | 3.84 | 3.79 |
| Pack pressure (MPa) | 3.09 | 3.56 | 3.38 | 3.27 |
| Extruder speed (rpm) | 11 | 12 | 13 | 13 |
| Metering pump (amperes) | 1.17 | 1.22 | 1.17 | 1.24 |
| Metering pump speed (rpm) | 8.72 | 8.68 | 8.68 | 8.68 |
| Metering pump output (ghm) | 0.6 | 0.6 | 0.6 | 0.6 |
| Maximum spin speed (meters/minute) | 1800 | 1000 | 1500 | 2300 |
| Spin speed (meters/minute) | Elongation (%) | | | |
| 500 | 332 | 421 | 309 | 426 |
| 1000 | 212 | break | 184 | 238 |
| 1500 | 123 | break | Break | 171 |
| 2000 | break | break | Break | 129 |
| Spin speed (meters/minute) | Tenacity (grams/denier) | | | |
| 500 | 0.57 | 0.65 | 0.58 | 1.41 |
| 1000 | 0.87 | break | 0.95 | 2.44 |
| 1500 | 1.1 | break | Break | 3.13 |
| 2000 | break | break | Break | 0.87 |

The Tenacity and Elongation properties of the fibers reported in Table 3 were measured on a Statimat™ M, which is a microprocessor based machine that tests the strength and elongation of yarns and fibers at various stages of testing. The instrument used was a Textechno Statimat M, S/N 23523, CRE type, Program FPAM 0210E, using a Computer with Microsoft operating system and monitor. National Instruments GPIB Board (general purpose interface buss) adapter model No. PC11A as also used. An Alfred Suter Co. Denier Wheel was used. The internal standard was PP-3155 (ExxonMobil), collected at 2500 m/min with a denier (weight in grams of 9000 linear meter) of 144. The standard was run prior to testing. Percent elongation was the criteria used to evaluate the standard. During the testing, the internal standard had a mean of 170% with an upper control limit of 184.7% and a lower control limit of 155.4%. If running the standard yielded a point that was outside of the upper or lower control limits, the standard was rerun. The denier of the fiber was determined by using the Alfred Suter Denier Wheel. When the threads were inserted, they were first placed in the ceramic guides. They were then led on the right past the respective knobs of the upper row at an angle of about 45° to the corresponding knobs of the bottom row. The respective knob of the upper row has to be slightly pulled out by hand, so that the threads could slip under the clamping area. At the lower row, the thread ends were fixed by wrapping them once and drawing them behind the knobs then cutting off the projecting ends. The first thread end to be tested was directly inserted into the measuring clamp. When pushing the first changer carriage into the guide rail, it was moved by hand to the right until the angled ledge of the carriage touches the transporting belts. Once the machine was started, the tension arm picked up the threads from the measuring clamp and automatically started testing. The machine pulled the threads X number of times (Input on test screen; usually a minimum of 5). When this was complete, it automatically calculated the results. When testing was complete for the first thread, the tension arm moved to the second thread and began testing. After each thread was tested, the tension will move to the next test sample, until all testing was done. To choose the correct load cell, determined by denier, the 10 N was typically used with every fiber below 8 denier. The 100 N was used for anything that the 10 N could not read. The 100 N was used with 8 denier and above. The results were calculated by the computer. Results are reported as in Table 3.

While the addition of EP rubber and/or HDPE may improve some aspects of a facing layer such as softness, the maximum spinning speed and tenacity of the facing layer fibers was improved when such components are absent from the facing layer compositions, as seen in E2 relative to the other examples.

To demonstrate the softness or "hand" of the facing layers described herein, a set of experiments was performed by combining various amounts of Vistamaxx 2125 (MFR of 79 dg/min, C2 content of 13 wt %) with an isotactic polypropylene as in Table 4. While the softness improves with elastomer levels above 30 wt %, other properties desirable for the facing layer decline. Thus, there is a desirable balance between the level of elastomer and plastic.

TABLE 4

Handle-O-Meter measurements for a propylene-α-olefin elastomer (wt %) with isotactic polypropylene homopolymer compositions

| propylene-α-olefin elastomer (wt %) with isotactic polypropylene homopolymer | Handle-O-Meter Force (grams) | |
|---|---|---|
| | 35 g/m² fabric | 50 g/m² fabric |
| 10 | 54 | 68 |
| 20 | 43 | 36 |
| 40 | 16 | 14 |
| 60 | 15 | 16 |
| 80 | 18 | 19 |
| 100 | — | 17 |

The softness of a nonwoven fabric was measured according to the "Handle-O-Meter" test as specified in operating manual on Handle-O-Meter model number 211-5 from the Thwing-Albert Instrument Co. The Handle-O-Meter reading is in units of grams. The modifications were: (1) Two specimens per sample were used, and (2) readings were kept below 100 gram by adjusting the slot width used and the same slot width was used throughout the whole series of samples being compared. The Handle-O-Meter values used throughout have an error of ±25% of the reported value.

Having described the various features of certain embodiments of the multilayered fabrics and how they are made, described herein in numbered embodiments is:

1. A multilayer fabric comprising one or more facing layers and one or more elastic layers adjacent to or sandwiched there between, the one or more facing layers comprising, or consisting essentially of (a) a polypropylene; and (b) a propylene-α-olefin elastomer having and an MFR of less than 80 dg/min; wherein the facing layer is extensible and non-elastic and has a Handle-O-Meter value of less than 60 g and a 1% Secant Flexural Modulus of less than 1000 MPa, or within the range of from 500 or 600 or 700 to 1000 MPa.

2. The multilayer fabric of numbered embodiment 1, wherein the facing layer composition has a Tensile at yield of greater than 24 MPa.

3. A multilayer fabric comprising one or more facing layers and one or more elastic layers adjacent to or sandwiched there between, the one or more facing layers comprising, or consisting essentially of (a) a polypropylene; and (b) within the range from 0.1 to 30 wt %, by weight of the facing layer, of a propylene-α-olefin elastomer having and an MFR of less than 80 dg/min, a triad tacticity of 75% or more, and comonomer-derived content within the range from 5 to 18 wt %, by weight of the propylene-α-olefin elastomer.

4. The multilayer fabric of any one of the previous numbered embodiments, consisting essentially of one or more facing layers and one or more elastic layers sandwiched there between.

5. The multilayer fabric of any one of the previous numbered embodiments, wherein the facing layer consists essentially of the polypropylene and the propylene-α-olefin elastomer.

6. The multilayer fabric of any one of the previous numbered embodiments, wherein the fibers making up the facing layers are mono-component.

7. The multilayer fabric of any one of the previous numbered embodiments, the facing layer further comprising within the range from 0.1 to 10 wt %, by weight of the facing layer, of HDPE.

8. The multilayer fabric of any one of the previous numbered embodiments, wherein polyethylenes are absent from the facing layer.

9. The multilayer fabric of any one of the previous numbered embodiments, wherein the facing layer is extensible and non-elastic.

10. The multilayer fabric of any one of the previous numbered embodiments, wherein the propylene-α-olefin elastomer is present in the facing layer within the range from 5 to 25 wt %, by weight of the facing layer.

11. The multilayer fabric of any one of the previous numbered embodiments, wherein the propylene-α-olefin elastomer has not been visbroken.

12. The multilayer fabric of any one of the previous numbered embodiments, wherein the 35 g/m² facing layer has a Handle-o-Meter value of less than 60 g.

13. The multilayer fabric of any one of the previous numbered embodiments, wherein adhesives are absent.

14. The multilayer fabric of any one of the previous numbered embodiments, wherein films are absent.

15. The multilayer fabric of any one of the previous numbered embodiments, wherein the polypropylene has an MFR within the range from 10 to 50 dg/min.

16. The multilayer fabric of any one of the previous numbered embodiments wherein the propylene-α-olefin elastomer has an MFR within the range from 1 to 60 dg/min.

17. The multilayer fabric of any one of the previous numbered embodiments, wherein the facing layer composition has an MFR within the range from 10 to 40 dg/min.

18. The multilayer fabric of any one of the previous numbered embodiments, wherein the facing layer composition has a 1% Secant Flexural Modulus of less than 1000 MPa.

19. The multilayer fabric of any one of the previous numbered embodiments, wherein the facing layer composition has a Tensile at yield of greater than 24 MPa.

20. The multilayer fabric of any one of the previous numbered embodiments, wherein the fibers that make up the facing layer has an Elongation at Break of greater than 600%.

21. The multilayer fabric of any one of the previous numbered embodiments, wherein the one or more elastic layers comprises propylene-α-olefin elastomer, natural rubber, synthetic polyisoprene, butyl rubber, halogenated butyl rubbers, polybutadiene, styrene-butadiene rubber, nitrile rubber, hydrogenated nitrile rubbers, chloroprene rubber, polychloroprene, neoprene, EPM and EPDM rubbers, epichlorohydrin rubber, polyacrylic rubber, silicone rubber, fluorosilicone rubber, fluoroelastomers, perfluoroelastomers, polyether block amides, chlorosulfonated polyethylene, ethylene-vinyl acetate, thermoplastic elastomers, thermoplastic vulcanizates, thermoplastic polyurethane, thermoplastic olefins, polysulfide rubber, or blends of any two or more of these elastomers.

22. The multilayer fabric of any one of the previous numbered embodiments, wherein the one or more elastic layers comprises propylene-α-olefin elastomer, styrene-butadiene rubber, or blends thereof.

23. The multilayer fabric of any one of the previous numbered embodiments, wherein the one or more elastic layers consist essentially of propylene-α-olefin elastomer(s).

24. The multilayer fabric of any one of the previous numbered embodiments, wherein the fiber forming the facing layer has a Tenacity of greater than 0.60 g/den at a spin speed of 2000 m/min.

25. The multilayer fabric of any one of the previous numbered embodiments, wherein the fiber forming the facing layer has a Tenacity of greater than 2.0 g/den at a spin speed of 1500 m/min.

26. The multilayer fabric of any one of the previous numbered embodiments, wherein the fiber forming the facing layer has an Elongation of greater than 100% at a spin speed of 2000 m/min.

27. The multilayer fabric of any one of the previous numbered embodiments, wherein the fiber forming the facing layer has an Elongation of greater than 120% at a spin speed of 1500 m/min.

28. The multilayer fabric of any one of the previous numbered embodiments, wherein the one or more facing layers are carded or spunbond fabrics.

29. The multilayer fabric of any one of the previous numbered embodiments, wherein the multilayer fabric has a layered structure selected from the group consisting of $S_{ep}S_{el}M_{el}M_{el}S_{ep}$, $S_{ep}S_{el}M_{el}S_{el}S_{ep}$, $S_{ep}S_{el}M_{el}S_{el}C_{ep}$, $C_{ep}S_{el}M_{el}S_{el}C_{ep}$, $S_{ep}S_{el}M_{ep}S_{el}S_{ep}$, $S_{ep}S_{el}M_{ep}S_{el}C_{ep}$, $C_{ep}S_{el}M_{ep}S_{el}C_{ep}$, $C_{ep}S_{el}M_{el}M_{el}S_{el}C_{ep}$, $C_{ep}C_{el}M_{el}C_{el}C_{ep}$ and $C_{ep}S_{el}M_{el}C_{el}C_{ep}$.

30. A method of forming a multilayer fabric of any one of the previous numbered embodiments comprising combining one or more facing layers with one or more elastic layers adjacent to or sandwiched there between.

31. The method of numbered embodiment 30, wherein the layers are adhered to one another through a heated calendaring means (e.g., one, two or more embossed or smooth calendar rolls making contact, preferably pressured contact, with the layers of fabric), the temperature set to a level that will cause the layers to adhere to one another at the desired level. In one embodiment the calendaring temperature is less than 105 or 100 or 95° C.

32. The method of numbered embodiment 30 or 31, wherein the multilayer fabric is activated by a mechanical activation means, such as by using a ring roll.

Described in another embodiment is the use of a propylene-α-olefin elastomer and polypropylene blend to form a facing layer of a multilayer fabric, the elastomer and polypropylene having any one or more of the properties as described herein.

Described in yet another embodiment is the use of one or more facing layers and one or more elastic layers adjacent to the one or more facing layers or sandwiched there between to form a multilayer fabric, the one or more facing layers comprising, or consisting essentially of a polypropylene and a propylene-α-olefin elastomer having and an MFR of less than 80 dg/min; wherein the facing layer is extensible and non-elastic and has a Handle-O-Meter value of less than 60 g and a 1% Secant Flexural Modulus of less than 1000 MPa.

What is claimed is:

1. A multilayer fabric comprising one or more facing layers and one or more elastic layers adjacent to or sandwiched there between, the one or more facing layers consisting essentially of:
    (a) a polypropylene; and
    (b) within the range from 0.1 to 30 wt %, by weight of the facing layer, of a propylene-α-olefin elastomer having an MFR of less than 70 dg/min;
    wherein the facing layer is extensible and non-elastic and has a Handle-O-Meter value of less than 60 g and a 1% Secant Flexural Modulus of less than 1000 MPa;
    wherein each of the one or more elastic layers has an ultimate tensile strength greater than 5.5 MPa, an ultimate elongation greater than or equal to 200%, and a tension set less than 20% at 100% elongation.

2. The multilayer fabric of claim 1, wherein the facing layer composition has a Tensile at yield of greater than 24 MPa.

3. A multilayer fabric comprising one or more facing layers and one or more elastic layers adjacent to or sandwiched there between, the one or more facing layers comprising:
    (a) a polypropylene; and
    (b) within the range from 0.1 to 30 wt %, by weight of the facing layer, of a propylene-α-olefin elastomer having an MFR of less than 70 dg/min, a triad tacticity of 75% or more, a melting point of less than 100° C., and comonomer-derived content within the range from 5 to 13 wt %, by weight of the propylene-α-olefin elastomer, wherein the propylene-α-olefin elastomer has not been visbroken;
    wherein each of the one or more elastic layers has an ultimate tensile strength greater than 5.5 MPa, an ultimate elongation greater than or equal to 200%, and a tension set less than 20% at 100% elongation.

4. The multilayer fabric of claim 3, the facing layer further comprising within the range from 0.1 to 10 wt %, by weight of the facing layer, of HDPE.

5. The multilayer fabric of claim 3, wherein polyethylenes are absent from the facing layer.

6. The multilayer fabric of claim 3, wherein the facing layer is extensible and non-elastic.

7. The multilayer fabric of claim 3, wherein the 35 g/m² facing layer has a Handle-o-Meter value of less than 60 g.

8. The multilayer fabric of claim 3, wherein adhesives are absent.

9. The multilayer fabric of claim 3, wherein films are absent.

10. The multilayer fabric of claim 3, wherein the polypropylene has an MFR within the range from 10 to 50 dg/min.

11. The multilayer fabric of claim 3, wherein the facing layer composition has an MFR within the range from 10 to 40 dg/min.

12. The multilayer fabric of claim 3, wherein the facing layer composition has a 1% Secant Flexural Modulus of less than 1000 MPa.

13. The multilayer fabric of claim 3, wherein the facing layer composition has a Tensile at yield of greater than 24 MPa.

14. The multilayer fabric of claim 3, wherein the fibers that make up the facing layer has an Elongation at Break of greater than 600%.

15. The multilayer fabric of claim 3, wherein the fiber forming the facing layer has a Tenacity of greater than 0.60 g/den at a spin speed of 2000 m/min.

16. The multilayer fabric of claim 3, wherein the fiber forming the facing layer has an Elongation of greater than 100% at a spin speed of 2000 m/min.

17. The multilayer fabric of claim 3, wherein the one or more facing layers are carded or spunbond fabrics.

18. The multilayer fabric of claim 3, wherein the multilayer fabric has a layered structure selected from the group consisting of $S_{ep}S_{el}M_{el}M_{el}S_{ep}$, $S_{ep}S_{el}M_{el}S_{el}S_{ep}$, $S_{ep}S_{el}M_{el}S_{el}C_{ep}$, $C_{ep}S_{el}M_{el}S_{el}C_{ep}$, $S_{ep}S_{el}M_{ep}S_{el}S_{ep}$, $S_{ep}S_{el}M_{ep}S_{el}C_{ep}$, $C_{ep}S_{el}M_{ep}S_{el}C_{ep}$, $C_{ep}S_{el}M_{el}M_{el}S_{el}C_{ep}$, $C_{ep}C_{el}M_{el}C_{el}C_{ep}$ and $C_{ep}S_{el}M_{el}C_{el}C_{ep}$.

19. A method of forming a multilayer fabric comprising combining one or more facing layers with one or more elastic layers adjacent to or sandwiched there between, the one or more facing layers comprising:
    (a) a polypropylene; and
    (b) a propylene-α-olefin elastomer having an MFR of less than 70 dg/min, wherein the propylene-α-olefin elastomer has not been visbroken;
    wherein the facing layer is extensible and non-elastic and has a Handle-O-Meter value of less than 60 g and a 1% Secant Flexural Modulus of less than 1000 MPa; and
    wherein each of the one or more elastic layers has an ultimate tensile strength greater than 5.5 MPa, an ultimate elongation greater than or equal to 200%, and a tension set less than 20% at 100% elongation.

20. The method of claim 19, wherein the layers are adhered to one another through a heated calendaring means, the temperature set to a level that will cause the layers to adhere to one another at the desired level.

21. The multilayer fabric of claim 1, wherein the propylene-α-olefin elastomer is a reactor grade elastomer.

22. The multilayer fabric of claim 1, wherein the facing layer composition has an MFR within the range from 10 to 30 dg/min.

23. The multilayer fabric of claim 3, wherein the facing layer composition has an MFR within the range from 10 to 30 dg/min.

* * * * *